(12) United States Patent
Groff et al.

(10) Patent No.: US 7,533,080 B2
(45) Date of Patent: May 12, 2009

(54) COMMIT TREE OPTIMIZATION BASED ON RECOVERY TOPOLOGY INFORMATION

(75) Inventors: Dana D. Groff, Sammamish, WA (US); James E. Johnson, Bellevue, WA (US); John D. Doty, Seattle, WA (US); Jonathan M. Cargille, Seattle, WA (US); Kapil Gupta, Redmond, WA (US); Michael R. Clark, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/401,029

(22) Filed: Apr. 10, 2006

(65) Prior Publication Data

US 2007/0239736 A1 Oct. 11, 2007

(51) Int. Cl.
*G06F 17/30* (2006.01)
(52) U.S. Cl. .......................................... 707/2; 718/101
(58) Field of Classification Search ..................... 707/10
See application file for complete search history.

(56) References Cited

U.S. PATENT DOCUMENTS

| | | | | |
|---|---|---|---|---|
| 5,423,037 | A | 6/1995 | Hvasshovd | 707/202 |
| 5,740,433 | A | 4/1998 | Carr et al. | 707/202 |
| 6,202,079 | B1 * | 3/2001 | Banks | 718/101 |
| 6,499,063 | B1 | 12/2002 | Chessell et al. | 719/315 |
| 2002/0018448 | A1 | 2/2002 | Amis et al. | 370/255 |

OTHER PUBLICATIONS

"Optimizing use of Local Coordinators in Distributed Applications", IBM Technical Disclosure Bulletin, vol. 40, issue No. 2. TDB-ACC-NO: NN9702199. pp. 199-204. Publication date: Feb. 1, 1997.
M. Gerla and J.T.-C. Tsai, "Multicluster, mobile, multimedia radio network", ACM/Baltzer Journal of Wireless Networks. vol. 1, (No. 3), 1995, p. 255-265. http://citeseer.ist.psu.edu/gerla95multicluster.html.
A. B. Kulkarni et al., An Active Network Architecture for ATM WANs, presented at the Mobile Multimedia Commun. Conference at Princeton, NJ, Sep. 25-27, 1996. http://citeseer.ist.psu.edu/kulkarni96active.html.

* cited by examiner

*Primary Examiner*—Mohammad Ali
*Assistant Examiner*—Syed Haroon Hasan
(74) *Attorney, Agent, or Firm*—Workman Nydegger

(57) ABSTRACT

Minimizing transaction managers. A method that may be practiced in a commit tree topology including a plurality of transaction managers to manage transactions. The transactions include a set of operations that are all performed if a transaction is completed or all aborted if a transaction is not completed. The transaction managers store transaction result information to allow recovery of a transaction in case of system failure. The method includes acts for minimizing storage overhead by minimizing the number of transaction managers used to coordinate transactions. The method includes identifying a set of transaction managers. A first transaction manager is selected from among the set of transaction managers. A second transaction manager is identified from among the set of transaction managers that is always available when the first transaction manager is available. Messages are redirected from a subordinate associated with the first transaction manager to the second transaction manager.

11 Claims, 5 Drawing Sheets

| Feature | Reference |
|---|---|
| Commit Tree | 300 |
| Transaction Manager | 302,304,306,307,309 |
| Reduced Commit Tree | 320 |
| Reducing Operation | 322 |

| Feature | Reference |
|---|---|
| Commit Tree | 300 |
| Transaction Manager | 302,304,306,307,309 |
| Reduced Commit Tree | 320 |
| Reducing Operation | 322 |

| Transaction Manager | Weight |
|---|---|
| A | 5 |
| B | 3 |
| D | 3 |
| C | 2 |
| E | 2 |
| F | 0 |
| G | 0 |
| H | 0 |

COMMIT TREE OPTIMIZATION BASED ON RECOVERY TOPOLOGY INFORMATION

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computer systems may include databases that store data items. It may be important to ensure that changes to one database are not made if related changes to another database are not made. For example, consider the banking environment. Suppose a customer wants to transfer $100 from one account to another account. The first account will be debited $100 while the second account is credited $100. If one of the debiting and crediting take place but not both, errors will result. If the debiting takes place without the crediting, $100 will be lost. If the crediting takes place without the debiting, $100 is created in the second account.

To prevent these types of errors from occurring, transaction systems with appropriate safeguards are used. Some transaction systems use a distributed commit tree protocol to ensure atomicity, i.e. ensuring that a set of actions in a transaction are all performed or all aborted. For example, a transaction system may use a two phase commit protocol. Transaction aware resources, such as a databases, enlist in a transaction as required by the actions that an application takes. A transaction manager then sends a request to prepare to commit to each of the resource managers. Each of the resource managers prepares to commit their changes; this means they make all necessary changes or reserve all the necessary resources required to complete or undo the work associated with the transaction. For durable resources, they will write information to their durable store. If they complete all their preparations, the can then send a yes vote indicating that the resource manager is prepared to commit, or finalize, actions in the transaction. The transaction manager writes a commit record in its log and then issues an order to commit or an order to abort to each of the resource managers. The log allows the transaction manager to be used to recover for system failures during the processing of a transaction. If a resource manager receives an order to commit, the resource manager makes data associated with the action available and releases all resource locks. If a resource manager receives an order to abort, the resource manager aborts and undoes any changes associated with the work associated with the transaction and releases all resource locks. If a system goes down before it has received an order to commit or abort, the order can be subsequently reissued by using information stored in the log.

Transaction systems may be distributed across a number of different interconnected computer systems implemented in a distributed computing environment. Various transaction managers may be implemented on the same computer system or on different computer systems in the distributed environment. A number of transaction managers may all be part of the same transaction. The communication between the transaction managers may be arranged in a hierarchy where some are subordinate transaction managers and some are superior transaction managers in relation to each other. As such, the transaction managers may form a tree which is referred to herein as a "commit-tree". An increased number of transaction managers increases the amount of storage overhead that is required. Additionally, this frequently increases the linear execution time, as normally the log writes may be serialized between a superior and a subordinate transaction manager. This increased overhead can have a detrimental effect on system performance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method that may be practiced in a commit tree topology including a plurality of transaction managers to manage transactions where there are superior transaction managers and subordinate transaction managers in the commit tree topology. The transactions include a set of operations that are all performed if a transaction is completed or all aborted if a transaction is not completed. The transaction managers store transaction result information to allow recovery of a transaction in case of system failure. The method includes acts for minimizing storage overhead and communication performance by minimizing the number of transaction managers used to coordinate transactions without adversely impacting transaction manager availability. The method includes identifying a set of transaction managers. A first transaction manager is selected from among the set of transaction managers. A second transaction manager is identified from among the set of transaction managers that is always available, when the first transaction manager is available. Messages are redirected from a subordinate associated with the first transaction manager to the second transaction manager.

Another embodiment includes a method of arranging a commit tree. The method includes identifying a number of transaction managers. A weight is computed for each of the transaction managers in the number of transaction managers. The weight for each transaction manager is calculated according to how many other transaction managers each transaction manager is always available for. The transaction managers in the plurality of transaction managers are organized into a commit tree by weight with the transaction managers always available for the most number of other transaction managers on top of a hierarchical arrangement. Notably, weight may be calculated based on other factors in other embodiments. For example, weight may be a factor of performance of the transaction manager, locality of the transaction manager, or trust of the transaction manager. These are only exemplary, and other embodiments may calculate weight based on other factors.

In another embodiment, a method of communicating in a commit tree protocol is illustrated. The method includes sending a commit tree protocol message from an entity to a transaction manager. The commit tree protocol message is re-routed from the entity to a different transaction manager based on the different transaction manager always being at least as available as the original transaction manager.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Some embodiments described herein allow for the ability to reduce overhead in a distributed system by reducing the number of transaction managers used for a transaction. Further, the availability of a transaction manager to facilitate resource recovery is nonetheless appropriately maintained by appropriately selecting which transaction managers are removed. In one embodiment, this may be accomplished by recognizing that one or more transaction managers are always available whenever a particular transaction manager is available. As such, protocol and logging activities can be redirected from the particular transaction manager to one of the other transaction managers that are always available whenever the particular transaction manager is available. The particular transaction manager can then be removed from use such that there is no need to maintain a transaction manager log at the particular transaction manager. Additionally, as the removed transaction manager no longer needs to be communicated with, there is an amount of messaging between transaction managers that is removed as well.

Transaction managers can be iteratively removed using the process described above such that a minimum number of transaction managers remain in a commit tree so as to work towards minimizing the amount of overhead needed to manage a transaction without reducing the availability of the transaction outcome. Additionally, to facilitate the minimization of transaction managers, transaction managers may be weighted where the weight corresponds to the number of other transaction managers the transaction manager is available for. This allows the transaction managers to be selected in an ordered fashion such that smaller sets of transaction managers can be achieved. Further, using the weighting, a commit tree can be organized in an efficient manner. Notably, the embodiments described herein can be implemented on individual computer system, on distributed computer systems, with virtual machines, etc.

Figure 1A:
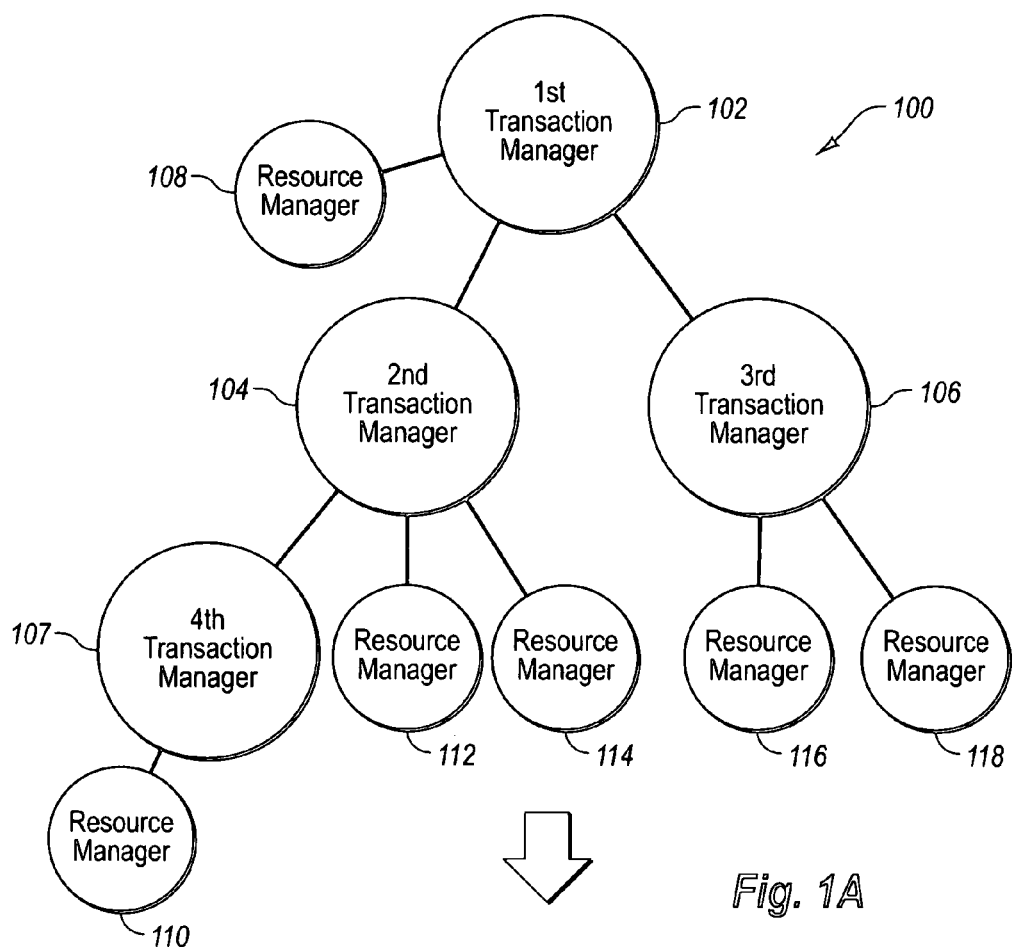
FIG. 1A illustrates a commit tree topology.

Referring now to FIG. 1A, a commit tree 100 is illustrated. The commit tree 100 includes a first transaction manager 102, a second transaction manager 104, a third transaction manager 106 and a fourth transaction manager 107. In this example the second transaction manager 104 and the third transaction manager 106 are subordinate to the first transaction manager 102 and the fourth transaction manager 107 is subordinate to the second transaction manager 104. A resource manager 108 enlists with the first transaction manager and is thus associated with the first transaction manager 102. While resource managers are not technically subordinates of transaction managers, they are referred to and claimed herein as subordinates, as are subordinate transaction managers, to illustrate bow resource managers associated with a transaction manager and transaction managers subordinate to a transaction manager can be migrated when the transaction manager is removed from a commit tree. Resource manager 110 is subordinate to the fourth transaction manager 107. Resource managers 112 and 114 are subordinate to the second transaction manager 104. Resource managers 116 and 118 are subordinate to the third transaction manager 106.

Enlist requests can be sent from the resource managers 110, 112, 114, 116, 118 to their respective transaction managers when an application commands the resource managers and associated resources to perform some function as part of a transaction. The subordinate transaction managers 104, 106, and 107 can then send propagation requests, which are similar to enlists requests and allow a subordinate transaction manager to manage transactions for a resource manager by acting as an intermediary between the resource manager and the superior transaction manager, to the transaction manager to which they are subordinate. For example, transaction managers 104 and 106 send propagation requests to the first transaction manager 102 as a result of receiving enlist requests from the resource managers 112, 114, and 116, 118 respectively. The fourth transaction manager 107 sends a propagation request to the second transaction manager 104 as a result of receiving an enlist request from the resource manager 110.

The first transaction manager 102 sends a request to prepare to commit messages to the second transaction manager 104 and third transaction manager 106 and the resource manager 108. The second and third transaction managers 104, 106 can forward request to prepare to commit messages onto entities subordinate to the second transaction manager 104 and third transaction manager 106, including transaction manager 107, resource managers 110, 112, 114, and 116, 118 respectively. The second transaction manager 104 and third transaction managers 106 can respond to the first transaction manager 102 with yes voting. This may include yes voting for the second transaction manager 104 and third transaction manager 106 themselves as well as yes voting for the transaction manager 107, resource managers 110, 112, 114 and 116, 118 respectively. The first transaction manager 102 can send orders to commit to the second transaction manager 104 and the third transaction manager 106, which can then be forwarded to transaction managers and resource managers subordinate to the second transaction manager 104 and third transaction manager 106.

Figure 1B:
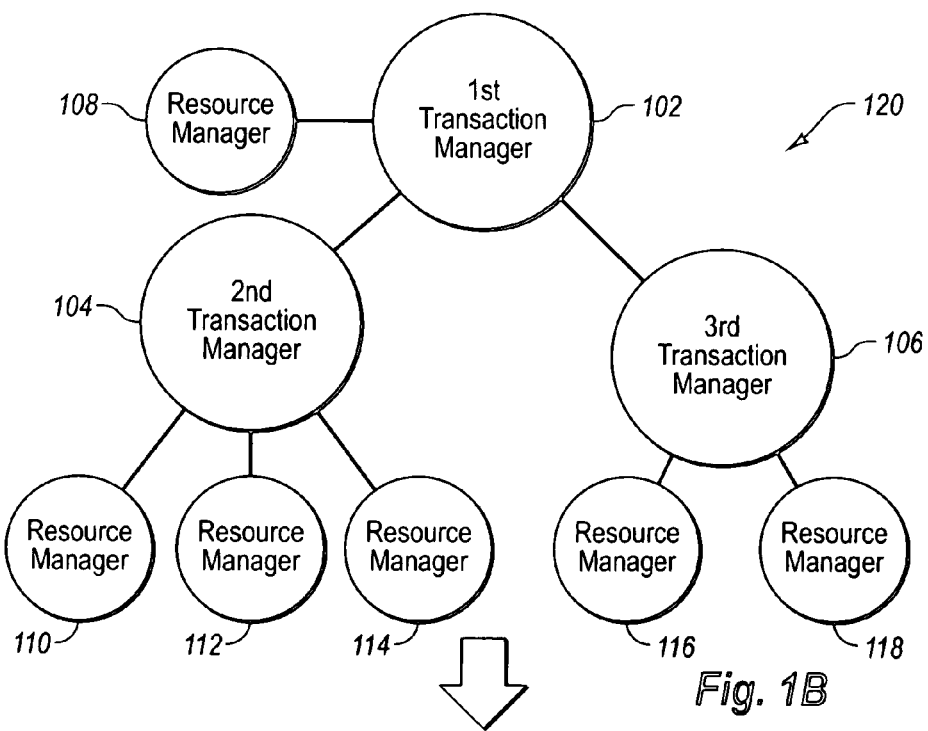
FIG. 1B illustrates a reduced commit tree topology.

FIG. 1B further illustrates a reduced commit tree 120. In the reduced commit tree 120 the fourth transaction manager 107 has been eliminated. This may be accomplished by recognizing, when such is the case, that the second transaction manager 104 is always available whenever the fourth transaction manager 107 is available. As such, transactional system protocol messages from transaction managers and resource managers subordinate to the fourth transaction manager 107 can be routed to the second transaction manager. As shown by the reduced commit tree 120 the resource manager 110 that was subordinate to the fourth transaction manager 107 in the commit tree 100 can be re-routed to the second transaction manager 104 as illustrated in the reduced commit tree 120.

In one embodiment, this may be accomplished by using a dispatch layer which is a thin communication layer that sits between resource managers and transaction managers. The dispatch layer understands which enlistment of a resource manager is associated with which transaction manager. The dispatch layer is able to contact any of the transaction managers on the system. Further, the dispatch layer is able to read, or be told, "available-with" information which describes which transaction managers are always available with other transaction managers. Additionally, the dispatch layer can adapt to changes in the "available-with" information when new transaction managers are introduced into an available with set.

This dispatch layer 204, when receiving an enlist request or a propagation request, which bind either a resource or a subordinate transaction manager into the commit tree respectively, finds the associated transaction manager. It then looks for an "available-with" set that has the associated transaction manager as a source. If it finds one, it then looks in that set to see if a transaction manager has been designated for this transaction already. If one has, the dispatch layer 204 transparently redirects the request to that transaction manager immediately. If not, it marks associated transaction manager as the one selected, and forwards the request to it.

Figure 2:
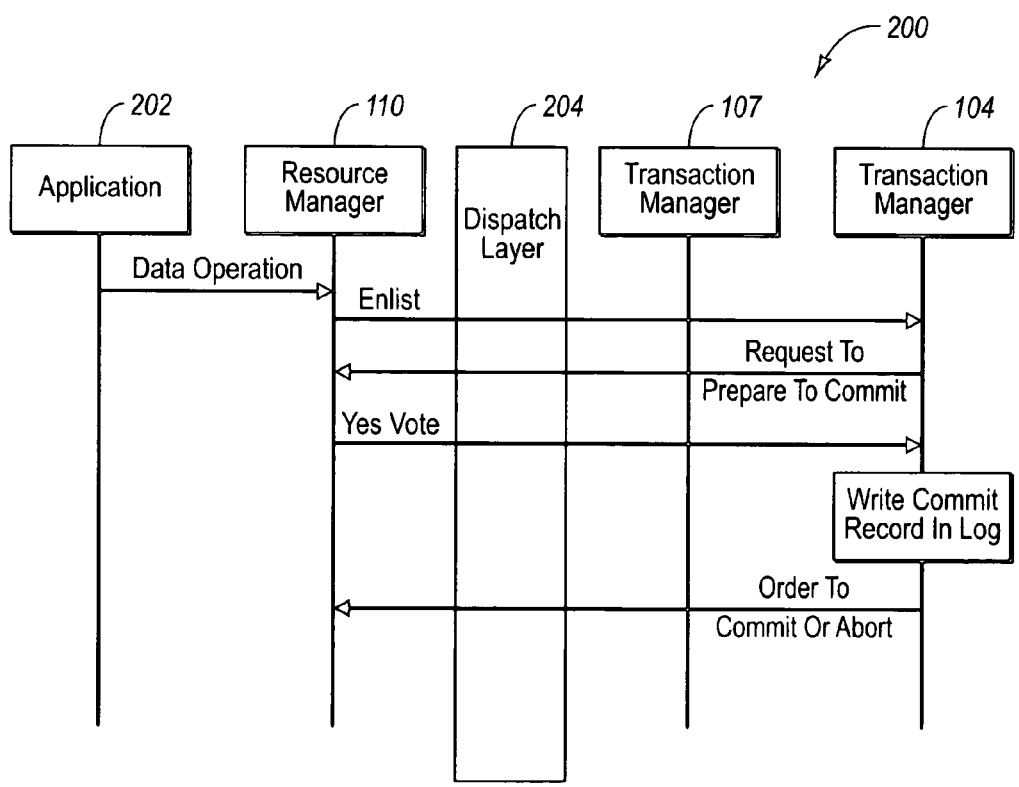
FIG. 2 illustrates commit tree protocol messages.

An example of the dispatch layer is illustrated in FIG. 2. In FIG. 2, a protocol message map 200 is illustrated. The protocol message map 200 illustrates an application 202, the resource manager 116, the first transaction manager 102, the second transaction manager 104, and the third transaction manager 106. FIG. 2 further illustrates a dispatch layer 204.

Illustrating now an example, the application 202 sends a data operation command to a resource under control of the resource manager 110. As illustrated in FIG. 1A by the commit tree map 100, the resource manager 110 is associated with the fourth transaction manager 107. As such, the resource manager 110 sends an enlist message directed to the fourth transaction manager 107. However, the dispatch layer 204 recognizes that the fourth transaction manager 107 has been, or can be, removed from the commit tree and forwards messages from any subordinate of the fourth transaction manager 107 to the second transaction manager 104. As such, the enlist message is sent to the second transaction manager 104. The resource manager 110 and corresponding resource can perform any work associated with the transaction. The application 202 requests that the transaction commit. The second transaction manager 104 responds with a request to prepare to commit to the resource manager 110. When the resource manager 110 and resource have prepared and are willing to commit the transaction, the resource manager 110 sends a yes vote message through the dispatch layer 204 which is routed to the second transaction manager 104. The second transaction manager 104 can then write a commit record into its log to record yes votes from resource managers. Once the second transaction manager 104 has received the appropriate yes votes or no votes, the second transaction manager 104 can then issue an order to commit or an order to abort to the resource manager 110. The resource manager 110 and associated resource can then cause data changes to become available in the case of an order to commit or can undo any changes in the case of an order to abort.

Figure 1C:
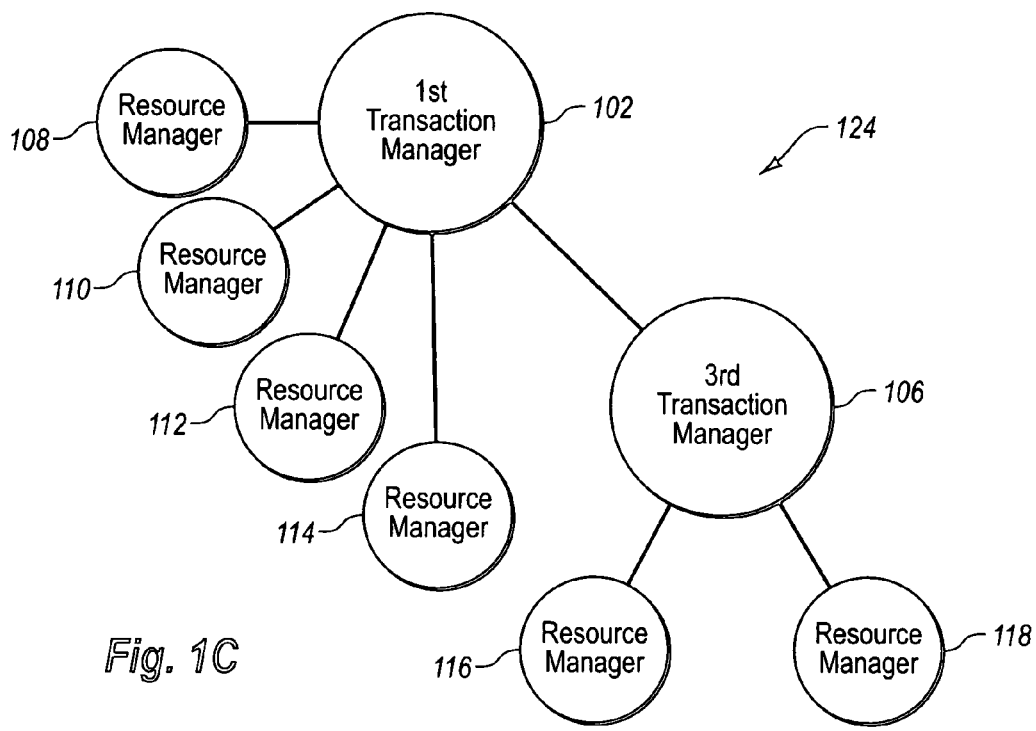
FIG. 1C illustrates a further reduced commit tree topology.

Referring now to FIG. 1C, further reductions in the commit tree 100 are illustrated. FIG. 1C illustrates a further reduced commit tree 124 where the second transaction manager 104 has been removed from the commit tree. This may be performed as the result of an iterative process. For example, in the first iteration, the fourth transaction manager 107 is removed as a result of recognizing that the second transaction manager is always available when the fourth transaction manager 107 is available. In a second iteration, the second transaction manager 104 may be removed by recognizing that the first transaction manager 102 is always available whenever the second transaction manager 104 is available. As such, any subordinates of the second transaction manager 104 have messages from them re-directed to the first transaction manager 102 through the dispatch layer 204 (FIG. 2).

Figure 3:
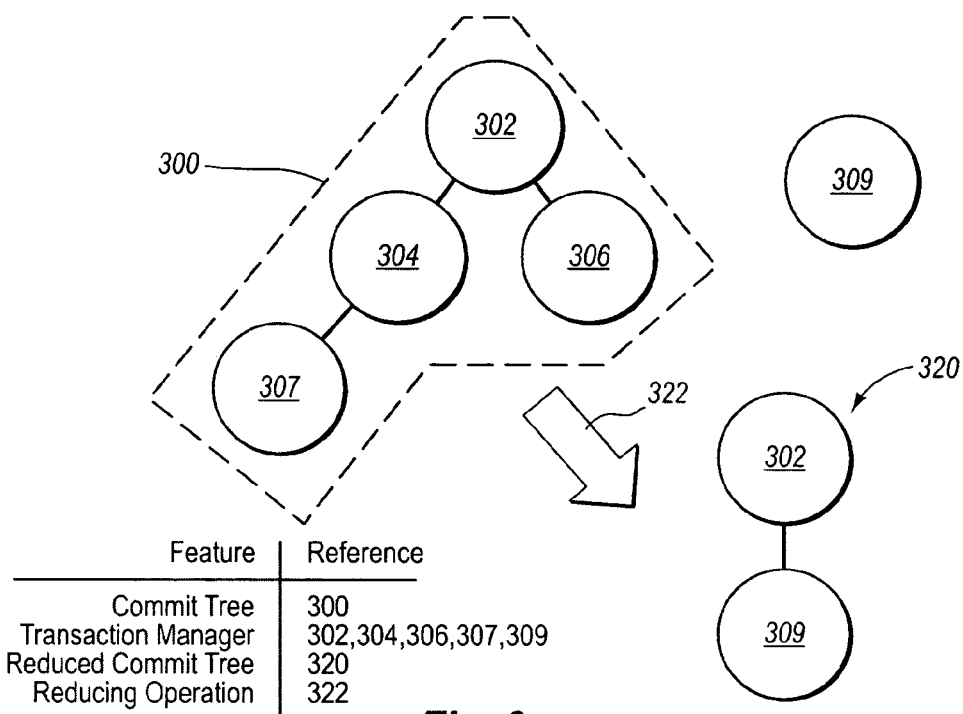
FIG. 3 illustrates commit tree topologies.

Referring now to FIG. 3 another example illustrating further aspects is shown. FIG. 3 illustrates a commit tree 300 including a first transaction manager 302, a second transaction manager 304, a third transaction manager 306, a fourth transaction manager 307. A fifth transaction manager 309 is also illustrated. FIG. 3 illustrates that the fifth transaction manager 309 is not originally associated with a particular transaction being performed, and thus is not part of the commit tree 300. However, aspects of some embodiments allow for transaction managers that are not originally associated with a particular transaction to nonetheless be used when reducing the number of transaction managers in a commit tree. For example, by realizing that the transaction manager 309 is always available whenever the second transaction manager 304, third transaction manager 306, and fourth transaction manager 307 are available a reduced commit tree 320 can be constructed, as illustrated by the reducing operation 322, that eliminates the second transaction manager 304, the third transaction manager 306, and the fourth transaction manager 307 by re-directing communications from subordinates of those transaction managers to the fifth transaction manager 309.

Figure 4:
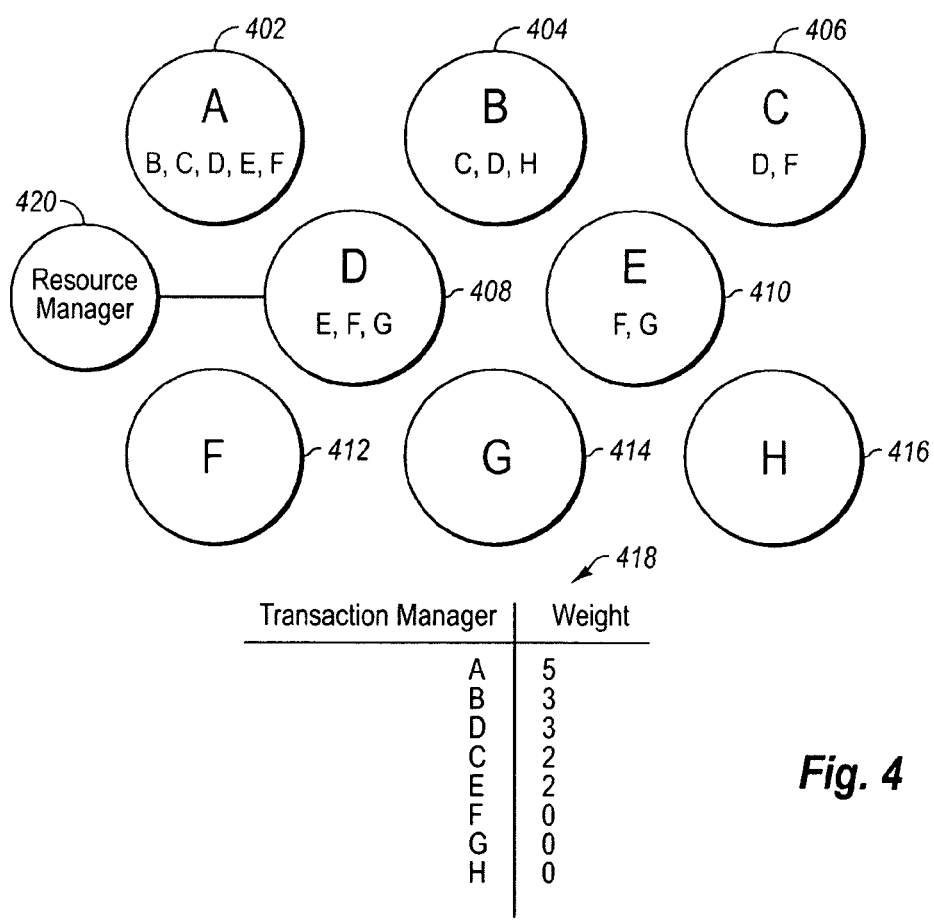
FIG. 4 illustrates weighted transaction managers.

Additional aspects are illustrated in FIG. 4. In particular FIG. 4 shows a set of transaction managers 400. Within the set of transaction managers 400 are transaction managers including transaction manager A 402, transaction manager B 404, transaction manager C 406, transaction manager D 408, transaction manager E 410, transaction manager F 412, transaction manager G 414 and transaction manager H 416. Some of the transaction managers illustrated in the set of transaction managers 400 may be such that they are always available when other transaction managers are available. For example, transaction manager A 402 may always start during system boot. Transaction manager B 404 may only start once a month. As such, transaction manager A 402 will always be available when transaction manager B 404 is available. However, transaction manager B 404 will not always be available when transaction manager A 402 is available.

In the example shown in FIG. 4, whenever transaction manager B 404, C 406, D 408, E 410 or F 412, is available so is transaction manager A 402. FIG. 4 further illustrates that whenever transaction manager C 406, D 408, and H 416 are available so is transaction manager B 404. Whenever transaction manager D 408 or F 412 is available so is transaction manager C 406. Whenever transaction manager B 410, F 412 or G 414 is available so is transaction manager D 408. Whenever transaction manager F 412 or G 414 is available so is transaction manager. E 410.

FIG. 4 further illustrates a transaction manager weighting graph 418. A weight is assigned to each transaction manager in the set of transaction managers 400. The weight is assigned based on the number of other transaction managers the particular transaction manager being weighted is always available for when the other transaction managers are available.

In one embodiment, the transaction manager selected to re-route transaction system protocol messages to may be selected by weight. For example, suppose that a resource manager 420 and associated resource is associated with transaction manager D 408. The transaction managers that are always available when transaction manager D 408 is available are transaction manager A 402, transaction manager B 404, and transaction manager C 406. Thus, any transaction system protocol messages from the resource manager 420 may be routed by the dispatch layer 204 (FIG. 2) to any one of these transaction managers. However, if the transaction manager to which the transaction system protocol messages are routed is selected by weight, where a higher weight indicates that a transaction manager is available more than other transaction managers weighted lower; then transaction manager A 402 will be selected to receive transaction system protocol messages from resource manager 420. By selecting transaction managers by weight, the likelihood that later enlistments would find an acceptable transaction manager already involved would be increased.

Figure 5:
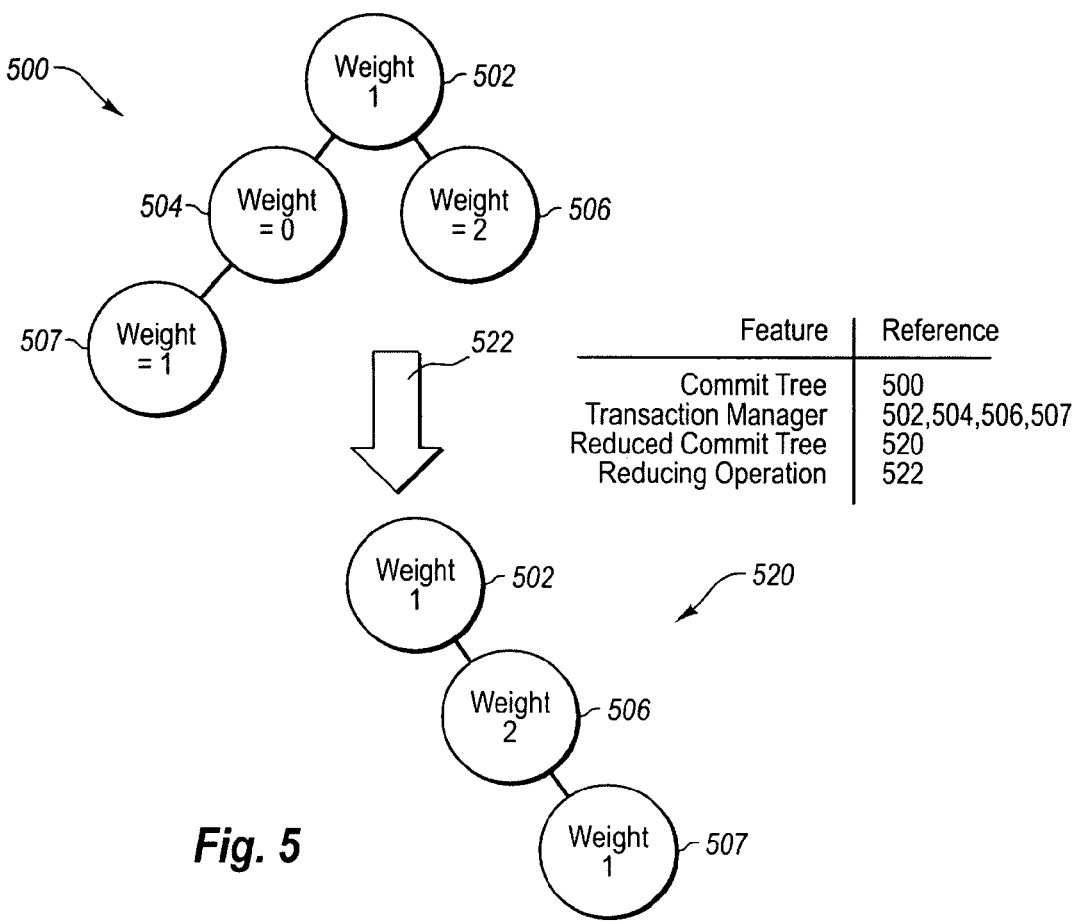
FIG. 5 illustrates commit tree topologies including a reduced topology reduced by comparing weights.

FIG. 5 illustrates a reduced commit tree 520 based on a commit tree 500 that has been reduced, as illustrated by the reducing operation 522, by selecting transaction managers according to weight. The commit tree 500 includes a first transaction manager 502 with a weight of 1, a second transaction manager 504 with a weight of 0, a third transaction manager 506 with a weight of 2 and a fourth transaction manager 507 with a weight of 1. In this example, the second transaction manager 504 has been eliminated. Assume that the first transaction manager 502 is always available whenever the second transaction manager 504 is available. Further assume that the third transaction manager 506 is also always available whenever the second transaction manager 504 is available. If there is a desire to remove the second transaction manager 504 from the commit tree 500 and a replacement is selected by weight, then all messages to and from subordinates of the second transaction manager 504 will be routed to the third transaction manager 506 which is the transaction manager with the highest weight that is always available when the second transaction manager 504 is available.

One embodiment may find particular usefulness in a cluster environment. Assume that a cluster contains a set of individual member systems, which may be running or failed at any point in time, and a set of "cluster resources", that are actively placed on one or another running system by the cluster infrastructure.

Cluster embodiments may be extended to establish which cluster resource group, if any, contains a transaction manager instance. All transaction instances within a cluster resource group can be assumed to be mutually available-with each other.

In one embodiment, a cluster may be configured to establish two rules. The first rule establishes that cluster resources are available-with targets for any local transaction manager. The second rule established that the cluster resources are mutually available-with any resource manager that is a cluster resource in the same cluster group.

The first rule allows local resources to prefer to use a cluster resource transaction manager over a local transaction manager. The second rule is implicit in the logic that a resource manager that is also a cluster resource will look for a viable transaction manager by first looking for one in its cluster group, then looking for any other cluster resource.

One embodiment further includes actions to optimally form a commit tree based on the weights. For example, a commit tree may be constructed using four transaction managers such as the commit tree 100 shown in FIG. 1A from the transaction managers shown in the set of transaction managers 400. It may be desirable to construct the commit tree 100 where the highest level transaction managers have the highest weights. Thus, the first transaction manager 102 may be transaction manager A 402 with a weight of 5. The second transaction manager 104, a lower level transaction manager, may be transaction manager B 404 with a weight of 3. The third transaction manager 106 may be transaction manager D 408, also with a weight of 3. The fourth transaction manager 107, the lowest transaction manager, may be transaction manager C 406 with a weight of 2. By forming a commit tree from heaviest weight to lightest weight, it becomes more likely percentage wise that the outcome of a transaction will be propagated throughout the commit tree in a timely manner.

Figure 6:
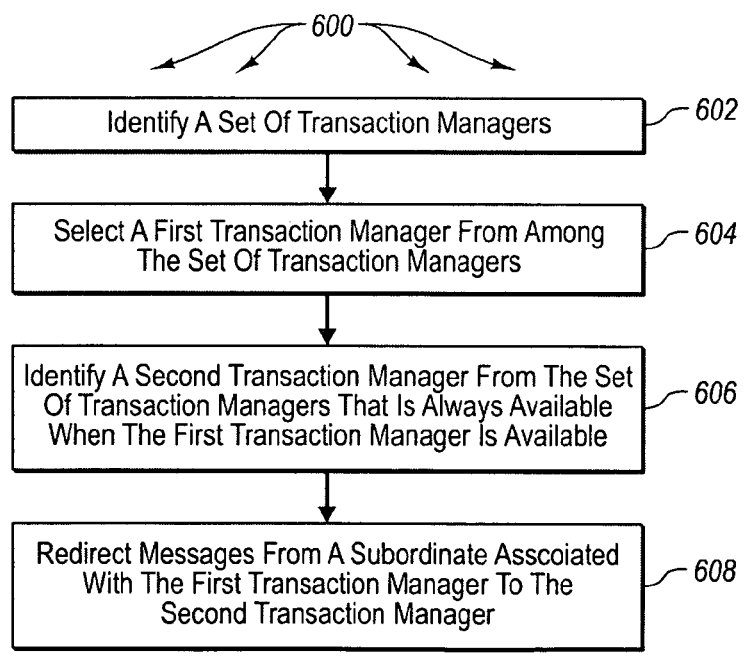
FIG. 6 illustrates a method of reducing a commit tree.

Referring now to FIG. 6, a method is illustrated. The method may be practiced, for example, in a commit tree topology including a plurality of transaction managers to manage transactions. The transactions include a set of operations that are all performed if a transaction is completed or all aborted if a transaction is not completed. The transaction managers store transaction result information to allow recovery of a transaction in case of system failure. The method includes acts for minimizing storage and communication overhead by minimizing the number of transaction managers used to coordinate transactions. The method includes identifying a set of transaction managers (act 602). The transaction managers may be identified as all being pre-associated with a particular transaction. For example, if a transaction performed in a distributed environment already has transaction managers pre-assigned, these transaction managers may be the set of identified transaction managers. In alternative embodiments, the set of transaction managers may be identified for managing a transaction even when one or more of the transaction managers is not pre-assigned to a particular transaction. For example, embodiments may include functionality for identifying that transaction managers are present with one another whether or not they are pre-assigned for a particular transaction. Commit tree protocol messages can be re-routed to other transaction managers, even when the other transaction managers were not pre-assigned to the transaction for the commit tree protocol messages.

The method 600 also includes selecting a first transaction manager from among the set of transaction managers (act 604).

The method further includes identifying a second transaction manager from among the set of transaction managers that is always available when the first transaction manager is available (act 606). Identifying a transaction manager from among the set of transaction managers may include identifying a transaction manager that is available for the highest number of other transaction manager from among the set of transaction managers. For example, in FIG. 4, if transaction manager C 406 is the first selected transaction manager, transaction manager A 402 is available for the highest number of other transaction managers. The transaction managers available for transaction manager C 406 are transaction manager A 402 and transaction manager B 404. Transaction manager A 402 is available for five transaction managers, whereas transaction manager B 404 is only available for three transaction managers.

Returning once again to FIG. 6, the method 600 further includes redirecting messages from a subordinate associated with the first transaction manager to the second transaction manager. The example above shown in conjunction with FIG. 2 illustrates an example where a commit tree protocol message from resource manager 110 directed to the transaction manager 107 is redirected to transaction manager 104.

The method 600 may further include removing the first transaction manager from the set of transaction managers.

The method 600 may be iteratively repeated with transaction managers remaining in the set of transaction managers. Iteratively repeating the acts of method 600 may be performed to obtain a minimum set of transaction managers needed to guarantee availability of transaction result information for a transaction.

The method 600 may further include assigning a weight to the transaction managers in the set of transaction managers. As such identifying a second transaction manager from among the set of transaction managers (act 606) may include identifying a transaction manager with a highest weight. In one embodiment higher weights are assigned based on a transaction manager always being available for a higher number of other transaction managers than other transaction managers.

Figure 7:
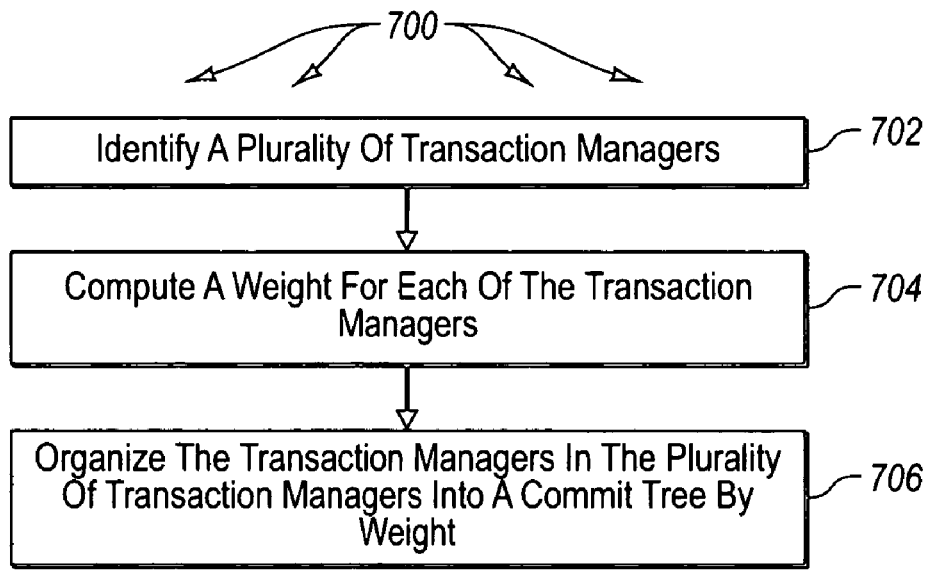
FIG. 7 illustrates a method of arranging commit trees.

Referring now to FIG. 7, a method 700 of arranging a commit tree is illustrated. The method 700 includes identifying a plurality of transaction managers (act 702). A weight is computed for each of the transaction managers in the plurality of transaction managers (act 704). The weight for each transaction manager is calculated according to how many other transaction managers each transaction manager is always available for.

The method 700 further includes organizing the transaction managers in the plurality of transaction managers into a commit tree by weight with the transaction managers always available for the most number of other transaction managers on top of a hierarchical arrangement (act 706).

The method 700, may further include routing commit tree messages between transaction managers in the plurality of transaction managers through a dispatch layer that includes information about which transaction managers are always available with other transaction managers. For example, FIG. 2 illustrates a dispatch layer 204 through which commit tree protocol messages can be routed.

Figure 8:
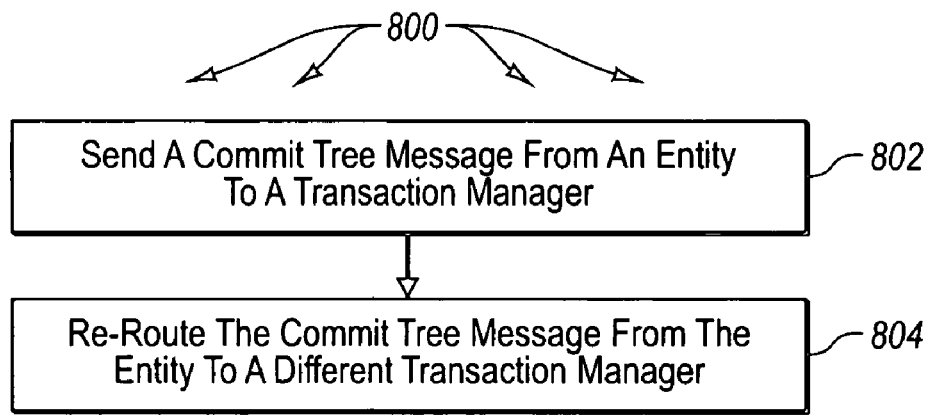
FIG. 8 illustrates a method of commit tree communication.

A method 800 of communicating in a commit tree protocol is illustrated in FIG. 8.

The method 800 includes sending a commit tree message from an entity to a transaction manager (act 802). The commit tree message is re-routed from the entity to a different transaction manager based on the different transaction manager always being available when the transaction manager is available (804). In one embodiment, the transaction manager and the different transaction manager may both be pre-assigned to the transaction. For example, a commit tree may have been constructed associating the two transaction managers to a particular transaction. In alternative embodiments, the different transaction manager is not pre-assigned to the transaction. It may be recognized that the different transaction manager, though not assigned to the transaction, is available when the transaction manager is available. As such, re-routing may be performed by re-routing to the different transaction manager.

Re-routing the commit tree message from the entity to a different transaction manager may be performed based on the weight of the different transaction manager. As illustrated above, the different transaction manager may be assigned a weight based on the number of other transaction managers the different transaction manager is always available for. This weight may be used to determine that the different transaction manager is the transaction manager, from among a number of transaction managers, that the commit tree message should be re-routed to.

As illustrated previously herein re-routing the commit tree message from the entity to a different transaction manager may include re-routing at a dispatch layer that includes information about which transaction managers are always available with other transaction managers.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system, the computing system comprising a processing device, the computing system including a plurality of transaction managers, wherein at least some of the transaction managers are organized into a commit tree to manage transactions, the transactions including a set of operations that are all performed if a transaction is completed or all aborted if a transaction is not completed, the transaction managers storing transaction result information to allow recovery of a transaction in case of system failure, a method of minimizing at least one of storage overhead or inter transaction manager message traffic by minimizing the number of transaction managers used to coordinate transactions, the method comprising the following acts:
  (a) identifying a set of transaction managers;
  (b) identifying a first transaction manager from among the set of transaction managers;
  (c) identifying a second transaction manager from among the set of transaction managers, wherein the second transaction manager, when identified, is not part of the same commit tree as the first transaction manager;
  (d) determining that the second transaction manager is always available when the first transaction manager is available; and
  (e) redirecting messages from a subordinate resource manager associated with the first transaction manager to the second transaction manager based on the determination that the second transaction manager is always available when the first transaction manager is available, wherein redirecting is performed at a dispatch layer disposed between transaction managers and their subordinate resource managers, and wherein the dispatch layer understands which enlistment of a resource manager is associated with which transaction manager such that messages from the subordinate resource manager associated with the first transaction manager can be sent to the second transaction manager for a given transaction without first sending a message to the first transaction manager.

2. The method of claim 1, further comprising (f) removing the first transaction manager from the set of transaction managers.

3. The method of claim 2, further comprising iteratively repeating acts (b)-(f) with transaction managers remaining in the set of transaction managers.

4. The method of claim 3, wherein iteratively repeating acts (b)-(f) with transaction managers remaining in the set of transaction managers is performed to obtain a minimum set of transaction managers needed to guarantee availability of transaction result information for a transaction.

5. The method of claim 1, wherein identifying a second transaction manager from among the set of transaction managers comprises identifying a transaction manager that is available for the highest number of other transaction manager from among the set of transaction managers.

6. The method of claim 1, further comprising assigning a weight to the transaction managers in the set of transaction managers.

7. The method of claim 6, wherein identifying a second transaction manager from among the set of transaction managers comprises identifying a transaction manager with a highest weight.

8. The method of claim 7, wherein higher weights are assigned based on at least one of a transaction manager always being available for a higher number of other transaction managers than other transaction managers, performance of the transaction manager, locality of the transaction manager, or trust of the transaction manager.

9. The method of claim 1, wherein identifying a set of transaction managers comprises identifying a set of transaction managers that are all pre-assigned to manage a same transaction.

10. A computer readable storage medium for use in a computing system, the computing system comprising a processing device, the computing system including a plurality of transaction managers, wherein at least some of the transaction managers are organized into a commit tree to manage transactions, the transactions including a set of operations that are all performed if a transaction is completed or all aborted if a transaction is not completed, the transaction managers storing transaction result information to allow recovery of a transaction in case of system failure, the computer readable medium comprising computer executable instructions for implementing a method of minimizing at least one of storage overhead or inter transaction manager message traffic by minimizing the number of transaction managers used to coordinate transactions, wherein the computer readable storage medium has stored thereon computer executable instructions that when executed by the processing device cause the following to be performed:
  (a) identifying a set of transaction managers;
  (b) identifying a first transaction manager from among the set of transaction managers;
  (c) identifying a second transaction manager from among the set of transaction managers, wherein the second transaction manager, when identified, is not part of the same commit tree as the first transaction manager;
  (d) determining that the second transaction manager is always available when the first transaction manager is available; and
  (e) redirecting messages from a subordinate resource manager associated with the first transaction manager to the second transaction manager based on the determination that the second transaction manager is always available when the first transaction manager is available, wherein redirecting is performed at a dispatch layer disposed between transaction managers and their subordinate resource managers, and wherein the dispatch layer understands which enlistment of a resource manager is associated with which transaction manager such that messages from the subordinate resource manager associated with the first transaction manager can be sent to the second transaction manager for a given transaction without first sending a message to the first transaction manager.

11. A computing system, the computing system comprising a processing device, and one or more computer readable storage media, the computing system including a plurality of transaction managers, wherein at least some of the transaction managers are organized into a commit tree to manage transactions, the transactions including a set of operations that are all performed if a transaction is completed or all aborted if a transaction is not completed, the transaction managers storing transaction result information to allow recovery of a transaction in case of system failure, the computing system configured to minimize at least one of storage overhead or inter transaction manager message traffic by minimizing the number of transaction managers used to coordinate transactions, by the processing device executing computer executable instructions stored on the computer readable media to perform the following acts:
  (a) identifying a set of transaction managers;
  (b) identifying a first transaction manager from among the set of transaction managers;
  (c) identifying a second transaction manager from among the set of transaction managers, wherein the second transaction manager, when identified, is not part of the same commit tree as the first transaction manager;
  (d) determining that the second transaction manager is always available when the first transaction manager is available; and
  (e) redirecting messages from a subordinate resource manager associated with the first transaction manager to the second transaction manager based on the determination that the second transaction manager is always available when the first transaction manager is available, wherein redirecting is performed at a dispatch layer disposed between transaction managers and their subordinate resource managers, and wherein the dispatch layer understands which enlistment of a resource manager is associated with which transaction manager such that messages from the subordinate resource manager associated with the first transaction manager can be sent to the second transaction manager for a given transaction without first sending a message to the first transaction manager.

* * * * *